US012094675B2

(12) United States Patent
Lambrecht et al.

(10) Patent No.: US 12,094,675 B2
(45) Date of Patent: Sep. 17, 2024

(54) ARRANGEMENT OF MEMS SWITCHES

(71) Applicant: Siemens Aktiengesellschaft, Munich (DE)

(72) Inventors: Franziska Lambrecht, Rückersdorf (DE); Markus Schwarz, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 205 days.

(21) Appl. No.: 17/631,077

(22) PCT Filed: Jul. 28, 2020

(86) PCT No.: PCT/EP2020/071269
§ 371 (c)(1),
(2) Date: Jan. 28, 2022

(87) PCT Pub. No.: WO2021/018888
PCT Pub. Date: Feb. 4, 2021

(65) Prior Publication Data

US 2022/0277913 A1 Sep. 1, 2022

(30) Foreign Application Priority Data

Jul. 31, 2019 (DE) ..................... 10 2019 211 460.1

(51) Int. Cl.
*H01H 59/00* (2006.01)
*H01H 1/00* (2006.01)

(52) U.S. Cl.
CPC ...... *H01H 59/0009* (2013.01); *H01H 1/0036* (2013.01); *H01H 2001/0084* (2013.01)

(58) Field of Classification Search
CPC ...... H01H 59/00; H01H 59/0009; H01H 1/00; H01H 1/0036; H01H 2001/00; H01H 2001/0084; H01H 2001/0036; H01H 2001/0042; H01H 2001/0052; H01H 2001/0068; H01H 2001/0078; H01H 47/002; H01H 47/004; H01H 2203/054; H01H 2001/0005
USPC .......................................................... 200/181
See application file for complete search history.

(56) References Cited

U.S. PATENT DOCUMENTS 7,466,065 B2 * 12/2008 Sanpei .................. H01H 61/00
310/330
8,570,713 B2 * 10/2013 Kumfer .................. H01H 9/542
361/624
2017/0062165 A1 3/2017 Gudeman ............. H01H 59/00
(Continued)

FOREIGN PATENT DOCUMENTS

DE 102017215236 A1 2/2019 ............... B81B 3/00
EP 2 164 089 3/2010 ............. H01H 59/00
EP 2 398 028 12/2011 ............... H01H 1/00
(Continued)

OTHER PUBLICATIONS

Search Report for International Application No. PCT/EP2020/071268, 12 pages, Nov. 5, 2020.

*Primary Examiner* — Anthony R Jimenez
(74) *Attorney, Agent, or Firm* — Slayden Grubert Beard PLLC

(57) ABSTRACT

Various embodiments include an arrangement comprising a plurality of MEMS switches with movable elements. The plurality of MEMS switches are connected to one another in a total-cross-tied configuration.

9 Claims, 3 Drawing Sheets

(56) References Cited

U.S. PATENT DOCUMENTS

| | | | | |
|---|---|---|---|---|
| 2019/0172672 A1 | 6/2019 | Bauer | .................... | H01H 59/00 |

FOREIGN PATENT DOCUMENTS

| | | | | |
|---|---|---|---|---|
| EP | 2 541 568 | 1/2013 | ............... | H01H 1/00 |
| WO | 2004 015728 | 2/2004 | ............... | H01H 1/00 |

* cited by examiner

ARRANGEMENT OF MEMS SWITCHES

CROSS-REFERENCE TO RELATED APPLICATIONS

This application is a U.S. National Stage Application of International Application No. PCT/EP2020/071269 filed Jul. 28, 2020, which designates the United States of America, and claims priority to DE Application No. 10 2019 211 460.1 filed Jul. 31, 2019, the contents of which are hereby incorporated by reference in their entirety.

TECHNICAL FIELD

The invention relates to an arrangement of MEMS switches with movable elements.

BACKGROUND

Three different solutions are typically used for switching electrical current: firstly, electromechanical relays are used, secondly, semiconductor switching elements are used and finally, MEMS switches (MEMS=microelectromechanical system) can be used. MEMS switches are based on the movement, which is usually electrostatically actuated, of a movable element, in particular a small beam, the movement of which transfers the MEMS switch into an open position or a closed position. The microscopic dimensions of the movable element advantageously allow short switching times and almost complete freedom from wear. However, the current-carrying capacity and dielectric strength of movable elements of MEMS switches are too low for many applications. In order to address higher power classes, a plurality of MEMS switches can be interconnected to form an arrangement and, in particular, arranged in a matrix. This requires the arrangement of a large number of identically produced MEMS switches, which have to exhibit identical behavior throughout the entire operating time. This can be achieved by means of a high process quality, but a large number of MEMS switches is rarely achievable.

SUMMARY

The teachings of the present disclosure describes arrangement of MEMS switches which are more fail-safe, in particular in the case of MEMS switches that do not meet the requirements in isolated cases. As an example, some embodiments include an arrangement of MEMS switches (20) with movable elements (90), which are connected to one another in a total-cross-tied configuration (10).

In some embodiments, the MEMS switches (20) are arranged like a matrix (30, 35).

In some embodiments, conductor connections (100, 110, 120) extend along at least two planes (245, 265) that are spaced apart from one another.

In some embodiments, the MEMS switches (20) each have a bending element (90) as movable element.

In some embodiments, each of the MEMS switches (20) has a respective first electrical contact (60) on the first movable and has a respective second electrical mating contact (70), the first contacts (60) being located on a first one of the planes (245) and the second contacts (70) being located on a second one of the planes (265).

In some embodiments, there are gate contacts (80), which are located in the first plane (245) and/or the second plane (265).

In some embodiments, the MEMS switches (20) each have a first part (150) and a second part (210), the first part (150) being formed with a silicon substrate and/or the second part (210) being formed with a glass wafer (220).

In some embodiments, the first part (150) is formed with a silicon-on-insulator substrate, in particular with a silicon-on-glass substrate.

In some embodiments, the first plane (245) is arranged on the first part (150) and the second plane (265) is arranged on the second part (210) and/or the first plane (245) is arranged on the second part (150) and the second plane (265) is arranged on the first part (150).

BRIEF DESCRIPTION OF THE DRAWINGS

The teachings herein are explained in more detail below with the aid of an embodiment illustrated in the drawings, in which.

DETAILED DESCRIPTION

Figure 1:
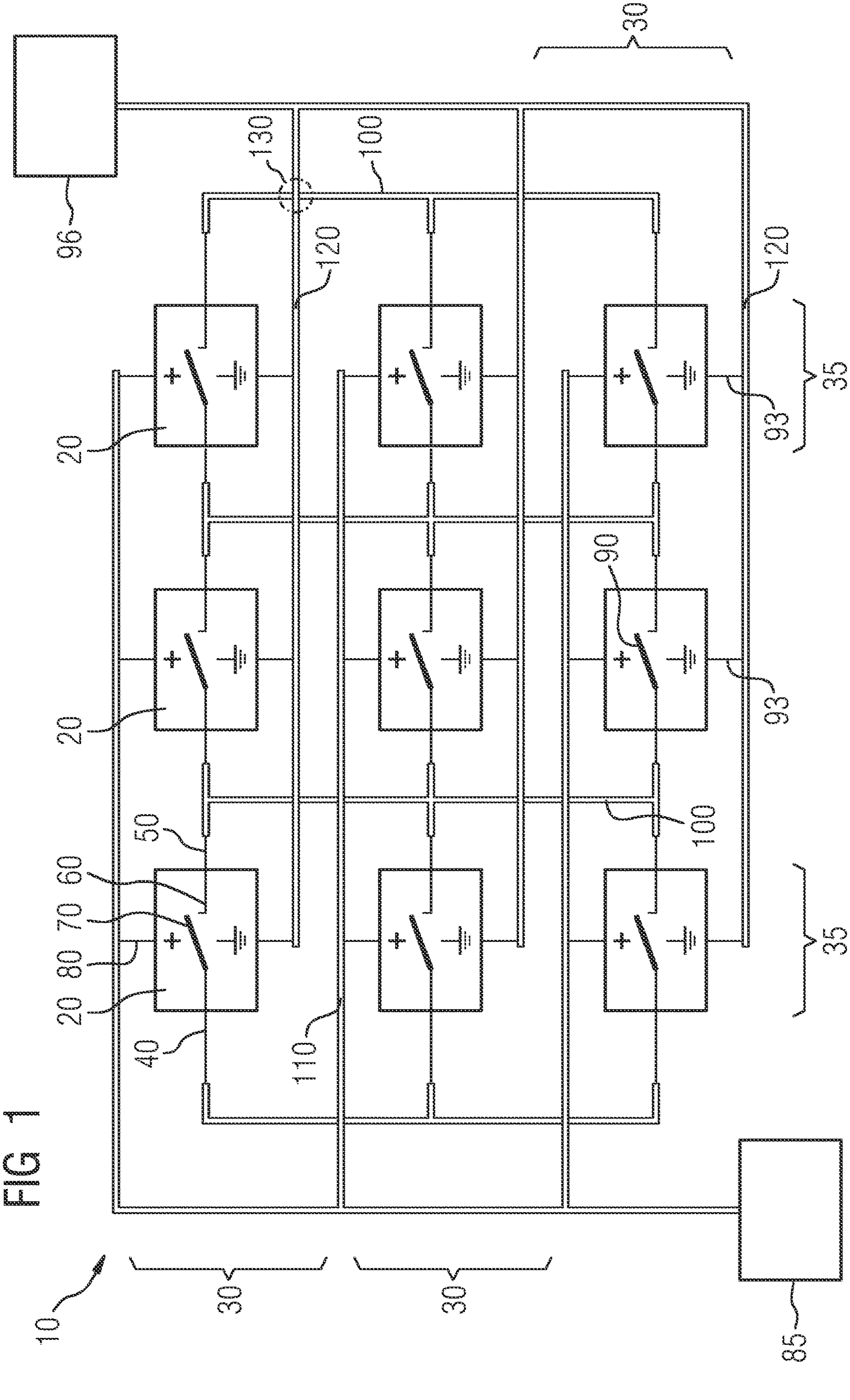
FIG. 1 schematically shows an example arrangement of MEMS switches in a basic circuit diagram incorporating teachings of the present disclosure.

The teachings of the present disclosure include MEMS switches having MEMS switches with movable elements, the MEMS switches being connected to one another in a total-cross-tied configuration.

In some embodiments, the MEMS switches are advantageously arranged like a matrix. The connection in a total-cross-tied configuration (TCT configuration) may provide a number of advantages: Firstly, in a TCT configuration, a plurality of MEMS switches are interconnected in parallel, which increases the current-carrying capacity of the arrangement relative to individual MEMS switches correspondingly proportionally to the number of MEMS switches that are connected in parallel with one another. Moreover, as a result of MEMS switches connected in series with one another, the dielectric strength of the arrangement is increased relative to the dielectric strength of individual MEMS switches. In this respect, the arrangement is already designed to be more fail-safe by virtue of the increased current-carrying capacity and the increased dielectric strength. The additional cross-connections in the TCT configuration additionally allow a redundant layout of the MEMS switches, such that faulty MEMS switches can easily be bypassed using the additional conduction paths.

In some embodiments, conductor connections advantageously extend along at least two planes that are spaced apart from one another. Line crossings within a plane can be avoided as a result of the conductor connections extending along at least two planes that are spaced apart from one another. Conductor connections that run at an angle to one another, in particular perpendicular to one another, can thus be arranged along planes that are spaced apart from one another, with the result that an actual line crossing does not occur. Thus, in this development, line crossings do not have to be taken into account separately during production, which would involve a very high degree of production complexity. In this development of the invention, it is therefore possible to produce a TCT configuration with MEMS switches very reliably.

In some embodiments, the MEMS switches each have a bending element as movable element.

In some embodiments, each of the MEMS switches has a respective first electrical contact on the movable element, and the MEMS switches each have a second electrical contact, the first contacts being located on a first one of the planes and the second contacts being located on a second one of the planes.

Two planes which are spaced apart from one another and along which conductor connections can be arranged can thus be formed on the movable element and spaced apart from said movable element. A conductive connection between components located in the two planes can then be brought about by a movement of the movable element.

In some embodiments, there are gate contacts in the arrangement, which gate contacts are located in the first plane and/or the second plane.

In some embodiments, the MEMS switches each have at least a first part and a second part, the first part being formed with a silicon substrate and/or the second part being formed with a glass wafer.

In some embodiments, the independent production of the at least two parts of the MEMS switch allows two planes to be provided during production without any appreciable outlay in terms of cost or additional effort, the conductor connections being able to be arranged along said planes as described above.

In some embodiments, the first part may be formed with a silicon-on-insulator substrate, in particular with a silicon-on-glass substrate.

In some embodiments, the first and second parts may be bonded to one another, for example by means of at least one eutectic and/or anodic bond and/or a silicon direct bond.

In some embodiments, at least one of the MEMS switches, or each of the MEMS switches, may be produced as described in the exemplary embodiment of DE 10 2017 215 236 A1.

In some embodiments, the first plane is arranged on the first part and the second plane is arranged on the second part, or the first plane is arranged on the second part and the second plane is arranged on the first part.

As shown in FIG. 1, the arrangement 10 of MEMS switches 20 is a matrix arrangement of MEMS switches 20, in which the MEMS switches 20 are arranged in a rectangular grid of rows 30 and columns 35 that are oriented perpendicular to one another. The MEMS switches 20 are successively connected in series in respective rows 30 in the matrix arrangement. For this purpose, the MEMS switches 20 each have a source connection 40 and a drain connection 50, which the MEMS switch 20 electrically isolates from one another in an open position by virtue of a first switching contact 60 and a second switching contact 70 being spaced apart from one another, and brings into electrically conductive contact with one another in a closed position.

Figure 2:
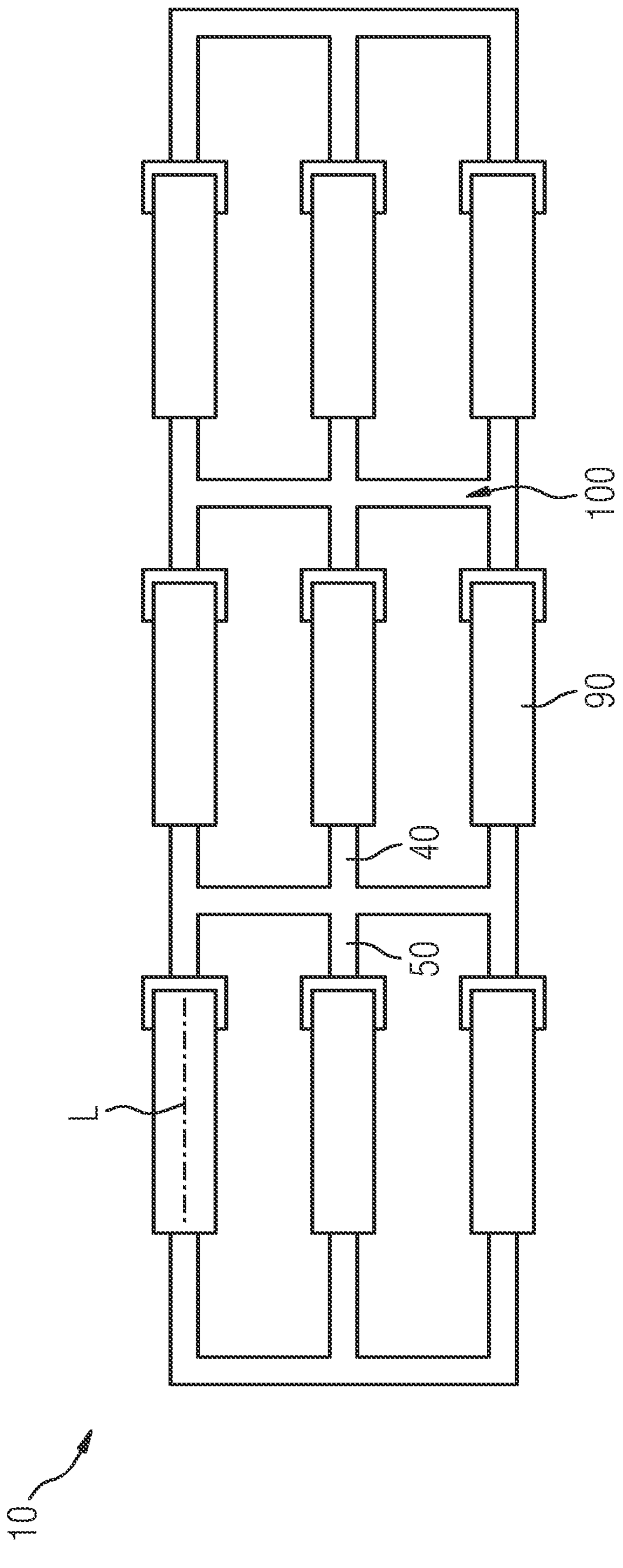
FIG. 2 schematically shows the arrangement of MEMS switches according to FIG. 1 in plan view.

The MEMS switches 20 each have a gate contact 80 for controlling the MEMS switches 20 so as to cause them to assume the open position and the closed position, said gate contact exerting, depending on a gate potential 85 applied thereto, an electrostatic force on a cantilever beam 90 (see also FIGS. 2 and 3) of the MEMS switch 20, which bears the second switching contact 70. The electrostatic force allows the cantilever beam 90 to be deflected, the second switching contact 70 being in electrically conductive contact with the first switching contact 60 in a rest position of the cantilever beam 90 and being spaced apart from the first switching contact 60 so as to be isolated in a deflected position. A ground contact 93 at ground potential 96 is arranged opposite the gate contact 80 in each of the MEMS switches 20, a source potential of the source connection 50 and a gate potential of the gate contact 80 each defining a voltage relative to said ground potential.

The MEMS switches 20 are thus opened or closed by means of the gate contact 80. The source connections 40 and the drain connections 50 of the MEMS switches 20 of different rows 30 and of the same respective column 35 are connected to one another by means of a connecting line 100. These connecting lines 100 across different rows 30 of a respective column 35 form, together with the rest of the configuration, described above, of the arrangement 10, a total-cross-tied configuration (TCT configuration). In a TCT configuration of this kind, the connecting lines 100 are therefore each oriented perpendicular to the orientation of the central longitudinal axis L of the cantilever beams 90. The connecting lines 100 therefore cross provided line connections 110 of the gate contacts 80 and line connections 120 of the ground contacts 93 at crossing points 130.

However, the crossing points 130 do not actually form any real crossing points in one plane, but rather merely appear to be such crossing points 130 in a circuit diagram. This is because the connecting lines 100, on the one hand, and the line connections 110 of the gate contacts 80 and the line connections 120 of the ground contacts 93, on the other hand, actually run in planes that are parallel to one another and spaced apart from one another.

Figure 3:
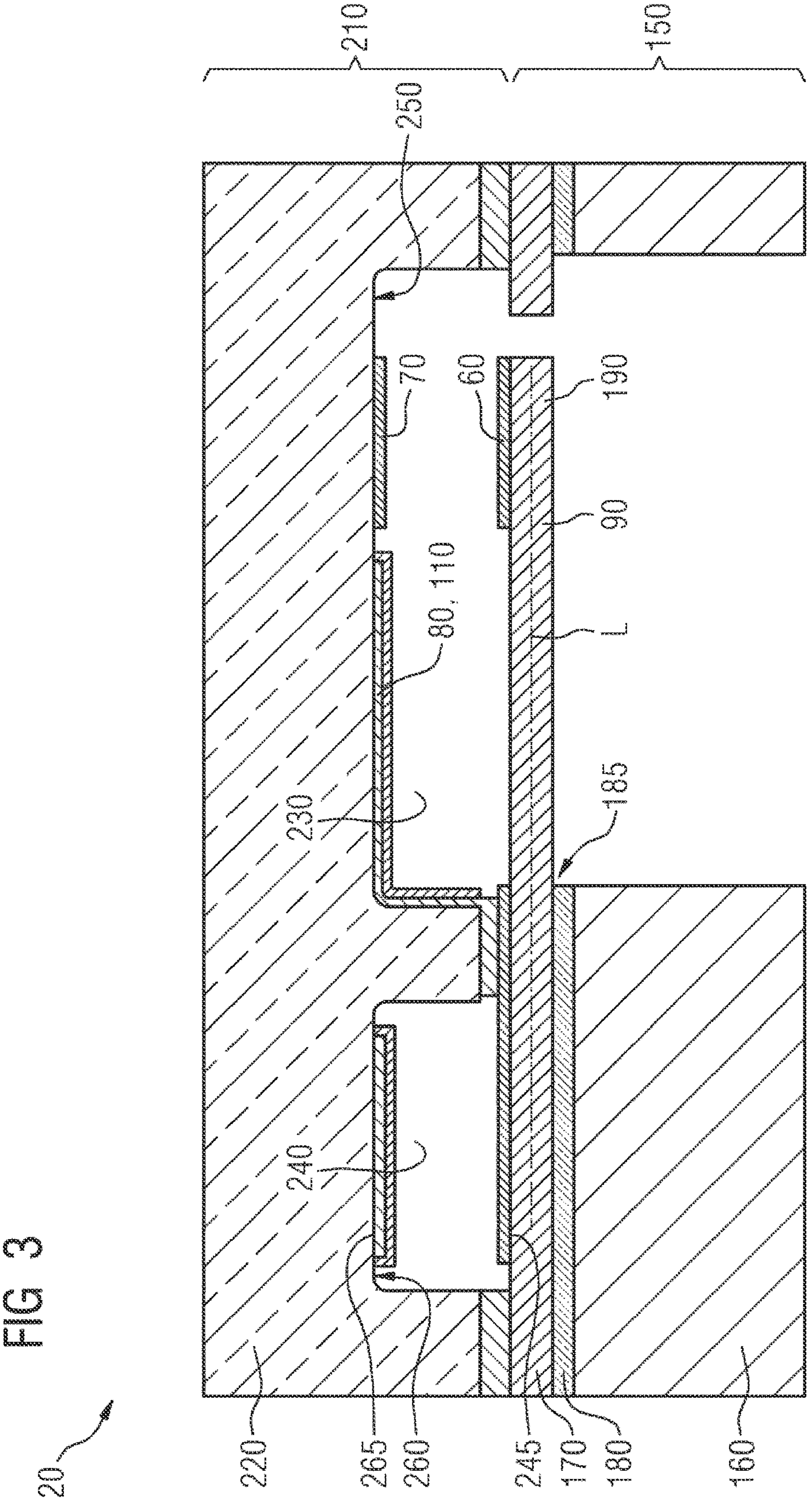
FIG. 3 schematically shows a MEMS switch of the arrangement of MEMS switches according to FIGS. 1 and 2 in longitudinal section.

This can be seen from the more detailed illustration of the MEMS switch 20 in FIG. 3. As illustrated, the MEMS switch 20 comprises two parts: A first part 150 is formed with a silicon-on-insulator substrate, which comprises two silicon layers 160, 170 separated by a glass layer 180. A first one of the silicon layers 160 has a thickness which is about 30 times thicker than the other, second silicon layer 170, which has a thickness of 10 micrometers. The second silicon layer 170 forms the cantilever beam 90, which is coupled to the first silicon layer 160 in a region 185 by means of the glass layer 180 and has a free end 190.

The cantilever beam 90 extends with its free end 190 away from the region 185 in a direction parallel to the unbounded, i.e. longest, more or less planar directions of extent of the glass layer 180, such that in the undeflected state, the central longitudinal axis L of the cantilever beam 90 extends parallel to the unbounded directions of extent of the glass layer 180. The silicon of the second silicon layer 170 and the glass of the glass layer 180 have been removed between the region 185 and the free end 190, such that the free end 190 can oscillate freely. The cantilever beam 90 has the first switching contact 60 at its free end 190.

The MEMS switch 20 additionally has a second part 210, which is formed with a glass wafer 220. The glass wafer 220 has two trenches 230, 240, which extend perpendicular to the central longitudinal axis L of the cantilever beam 90 and are open toward the first part 150 of the MEMS switch 20. A first one of the two trenches 230 extends with its width along the entire free part of the cantilever beam 90 and additionally beyond the free end 190 of the cantilever beam 90, such that the cantilever beam 90 can tilt unhindered into the first trench 230. The second switching contact 70 is attached to the bottom of the first trench 230 so as to face the first switching contact 60, such that the cantilever beam 90 can bring the first switching contact 60 and the second switching contact 70 into electrically contacting abutment with one another as a result of the cantilever beam 90 tilting into the first trench 230 toward the second part 210.

The second trench 240 extends parallel to the first trench 230 and opens towards the region 185. The second trench 240 is spaced apart from the first trench 230 by a fraction of its width, such that a rib is located between the first trench 230 and the second trench 240, said rib abutting against that end of the region 185 which adjoins the free end 190 of the cantilever beam 90.

The surface of the cantilever beam 90 that faces the second part forms a first plane 245 along which the connecting lines 100 of the source connections 40 extend with their conducting direction, i.e. the direction of a current flow through the connecting lines 100, in a direction perpendicular to the plane of the drawing. For example, the connecting lines 100 extend along the region 185.

A bottom 250, 260 of the trenches 230, 240, which extends substantially parallel to the central longitudinal axis L of the cantilever beam 90, forms a second plane 265, along which the connecting lines 110 of the gate contacts 80 extend with their conducting direction perpendicular to the plane of the drawing. For example, the connecting lines 120 can also extend along the second plane 265, for example along the base 260.

The MEMS switches 20 in this embodiment are designed and produced as described in the laid-open specification DE 10 2017 215 236 A1.

What is claimed is:

1. An arrangement comprising:

a plurality of microelectricalmechanical system (MEMS) switches, each switch comprising one or more movable elements;

wherein the plurality of MEMS switches are connected to one another in a total-cross-tied configuration including a plurality of rows extending along a first axis and a plurality of columns extending orthogonally to the first axis;

wherein each row of the plurality of rows comprises a first set of series connections between all of the individual MEMS switches in a respective row and each of the individual MEMS switches in a respective column are connected in parallel, creating a redundant layout of MEMS switches with increased dielectric strength in comparison to individual MEMS switches and increased current capacity in comparison to individual MEMS switches.

2. The arrangement as claimed in claim 1, wherein the MEMS switches are arranged like a matrix.

3. The arrangement as claimed in claim 1, wherein the movable element of each MEMS switch comprises a respective bending element.

4. The arrangement as claimed in claim 1, further comprising conductor connections extending along two planes spaced apart from one another.

5. The arrangement as claimed in claim 4, wherein each of the MEMS switches comprises:

a respective first electrical contact on a respective first movable element; and a respective second electrical mating contact;

wherein the first contact is located on a first one of the two planes and the second contact is located on a second one of the two planes.

6. The arrangement as claimed in claim 4, further comprising gate contacts located in a first plane of the two planes.

7. The arrangement as claimed in claim 1, wherein:

the MEMS switches each include a first part and a second part;

wherein the first part comprises a silicon substrate and/or the second part comprises a glass wafer.

8. The arrangement as claimed in claim 7, wherein the first part comprises a silicon-on-insulator substrate.

9. The arrangement as claimed in claim 7, wherein:

a first plane of the two planes is arranged on the first part and a second plane of the two planes is arranged on the second part.

* * * * *